(12) United States Patent
Kang

(10) Patent No.: US 7,557,894 B2
(45) Date of Patent: Jul. 7, 2009

(54) REFLECTIVE LIQUID CRYSTAL DISPLAY DEVICE AND FABRICATING METHOD THEREOF

(75) Inventor: Won-Seok Kang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 157 days.

(21) Appl. No.: 11/889,913

(22) Filed: Aug. 17, 2007

(65) Prior Publication Data
US 2008/0032433 A1 Feb. 7, 2008

Related U.S. Application Data

(62) Division of application No. 10/603,790, filed on Jun. 26, 2003, now Pat. No. 7,286,203.

(30) Foreign Application Priority Data
Dec. 31, 2002 (KR) .................. 10-2002-088289

(51) Int. Cl.
G02F 1/1339 (2006.01)
(52) U.S. Cl. .................. 349/155; 349/113; 349/156
(58) Field of Classification Search .............. 349/113, 349/155–156
See application file for complete search history.

(56) References Cited

U.S. PATENT DOCUMENTS

| 5,075,674 | A | 12/1991 | Katayama et al. ............. 345/93 |
| RE33,829 | E | 2/1992 | Castleberry .................. 345/92 |
| 5,408,345 | A | 4/1995 | Mitsui et al. |
| 5,751,382 | A | 5/1998 | Yamada et al. ................. 349/12 |
| 5,771,084 | A | 6/1998 | Fujimori et al. ............. 349/153 |
| 5,953,088 | A | 9/1999 | Hanazawa et al. ........... 349/110 |
| 6,219,118 | B1 | 4/2001 | Zhang ........................ 349/110 |
| 6,259,493 | B1 | 7/2001 | Nakamura et al. ............ 349/38 |
| 6,275,274 | B1 | 8/2001 | Kanemori et al. ............. 349/42 |

(Continued)

FOREIGN PATENT DOCUMENTS

JP 08-122823 5/1996

(Continued)

*Primary Examiner*—David Nelms
*Assistant Examiner*—Phu Vu
(74) *Attorney, Agent, or Firm*—Morgan Lewis & Bockius LLP

(57) ABSTRACT

A method of fabricating a reflective liquid crystal display device includes forming a gate line on a substrate having first and second pixel regions, forming a data line crossing the gate line and defining the pixel regions, forming a thin film transistor connected to the gate line and the data line, wherein the thin film transistor comprises a gate electrode, an active layer, and source and drain electrodes, forming first and second reflective electrodes over the thin film transistor, wherein the first and second reflective electrodes are separated from each other by a first gap, the first and second reflective electrodes are located at the first and second pixel regions, respectively, and completely cover the data line at the pixel regions, forming a photo sensitive organic layer on an entire surface of the substrate having the first and second reflective electrodes, and forming a patterned spacer filling the first gap between the first and second reflective electrodes by sequentially exposing and developing the photosensitive organic layer, wherein the photosensitive organic layer is exposed to light passing through the first gap.

10 Claims, 17 Drawing Sheets

U.S. PATENT DOCUMENTS

| | | |
|---|---|---|
| 6,504,593 B1 | 1/2003 | Noritake et al. |
| 6,693,681 B1 | 2/2004 | Takemura .................... 349/38 |
| 6,781,658 B1 | 8/2004 | Choi ......................... 349/139 |
| 2004/0021816 A1 | 2/2004 | Jeong et al. ................ 349/117 |
| 2004/0141112 A1 | 7/2004 | Kang ......................... 349/113 |

FOREIGN PATENT DOCUMENTS

| | | |
|---|---|---|
| JP | 10-253988 | 9/1998 |
| JP | 11-305220 | 11/1999 |
| JP | 2001-142078 | 5/2001 |

REFLECTIVE LIQUID CRYSTAL DISPLAY DEVICE AND FABRICATING METHOD THEREOF

This application is a divisional application of U.S. patent application Ser. No. 10/603,790 filed Jun. 26, 2003 now U.S. Pat. No. 7,286,203 which claims the benefit of the Korean Application No. P2002-088289 filed on Dec. 31, 2002, which is hereby incorporated by reference.

BACKGROUND OF THE INVENTION

1. Field of the Invention

The present invention relates to a liquid crystal display device, and more particularly, to a reflective liquid crystal display device and a fabricating method thereof. Although the present invention is suitable for a wide scope of applications, it is particularly suitable for providing a reflective liquid crystal display device with a high aperture ratio and a high brightness.

2. Discussion of the Related Art

In general, liquid crystal display (LCD) devices are classified into two categories according to a method of using a light source: transmissive LCD devices using a backlight unit and reflective LCD devices using an external light source. The transmissive LCD devices use a backlight unit, which consumes more than two thirds of the total power. On the other hand, since the reflective LCD devices use an external light source instead of a backlight unit, power consumption is reduced. However, the reflective LCD devices have low contrast ratio and low brightness because of the absence of a bright light source such as the backlight unit. To improve contrast ratio, a black matrix is generally used for the reflective LCD devices. However, the black matrix reduces a reflection area, thereby brightness is reduced.

FIG. 1 is a schematic perspective view of a reflective liquid crystal display device according to a related art.

In FIG. 1, first and second substrates 6 and 23 face into and are spaced apart from each other. A gate line 5 and a data line 17 crossing each other are formed on an inner surface of the first substrate 6. The gate line 5 and the data line 17 define a pixel region "P". A thin film transistor (TFT) "T" adjacent to each intersection of the gate line 5 and the data line 17 is connected to the gate line 5 and the data line 17. A reflective electrode (a pixel electrode) 18 connected to the TFT "T" is formed in the pixel region "P". The reflective electrode 18 may be made of a conductive material having high reflectance. For example, aluminum (Al) or Al alloy can be used for the reflective electrode 18.

A black matrix 21 and a color filter layer 22 including red, green, and blue sub-color filters 22a, 22b, and 22c are formed on an inner surface of the second substrate 23. Each sub-color filter 22a, 22b, and 22c is formed in a region corresponding to the pixel region "P". A transparent common electrode 24 is formed on the black matrix 21 and the color filter layer 22. A liquid crystal layer 20 is interposed between the reflective electrode 18 and the common electrode 24.

Even though not shown in FIG. 1, a spacer is used to maintain a cell gap between the first and second substrates 6 and 23. A ball spacer having a round shape is generally used. After a fabrication process of the first substrate 6 is finished, the ball spacer is dispersed through a specific method.

FIG. 2 is a schematic cross-sectional view showing a spacer of a liquid crystal display device according to the related art.

In FIG. 2, a spacer 40 is interposed between first and second substrates 6 and 23. A liquid crystal layer 20 wraps the spacer 40. Liquid crystal molecules 20a adjacent to the spacer 40 have a different alignment property from that of liquid crystal molecules 20b remote from the spacer 40 due to an influence of the spacer 40. As a result, light "L" passing through the adjacent liquid crystal molecules 20a causes light leakage in case of a dark state. Moreover, the ball spacer 40 is not uniformly distributed and tends to be concentrated. Sometimes, the ball spacer 40 moves infinitesimally to cause damage to a surface of alignment layers. Further, a very thin cell gap is requested for high-speed response of an LCD device. However, it is difficult to minimize a spacer for the very thin cell gap. Therefore, in order to resolve such problems, a patterning method of a spacer is suggested.

FIG. 3 is a schematic cross-sectional view of a liquid crystal display device including a patterned spacer according to the related art.

In FIG. 3, first and second substrates 50 and 60 face into and are spaced apart from each other. A thin film transistor (TFT) "T" including a gate electrode 52, an active layer 54, and source and drain electrodes 56 and 58 is formed on an inner surface of the first substrate 50. A pixel electrode 59 is connected to the drain electrode 58. A black matrix 62 corresponding to the TFT "T" and a color filter layer 64 corresponding to a pixel region "P" are formed on an inner surface of the second substrate 60. A transparent common electrode 66 is formed on the color filter layer 64.

A patterned spacer 68 having a columnar shape is formed between the pixel electrode 59 and the common electrode 66 through patterning an organic layer (not shown). Although the patterned spacer 68 can be formed on the first substrate 50 or the second substrate 60, the patterned spacer 68 is generally formed on the second substrate 60 (i.e., color filter substrate) because of its flat surface. The patterned spacer 68 may be disposed in a desired region and maintain a firm and stable cell gap by contacting the substrate. Moreover, since the patterned spacer 68 is not formed in the pixel region "P", light leakage may be prevented. The patterned spacer 68 can be made of a photosensitive organic layer having a negative type or a positive type.

FIGS. 4A and 4B are schematic cross-sectional views showing a fabricating method of a patterned spacer using a negative type photosensitive organic layer according to the related art.

In FIG. 4A, a black matrix 82 is formed on a substrate 80 and a color filter layer 84 including red, green, and blue sub-color filters 84a, 84b, and 84c is formed on the black matrix 82. Each sub-color filter 84a, 84b, and 84c corresponds to a space between the adjacent black matrices 82. A transparent common electrode 86 is formed on the color filter layer 84, and an organic layer 88 is formed on the common electrode 86 through coating a negative type photosensitive organic material (i.e., a negative photoresist). The negative type photosensitive organic material includes solvent, sensitizer, and resin. Generally, the sensitizer initiates a cross-link of the resin by ultra violet (UV) light. The cross-linked resin is insoluble in a developing solution.

A mask "M" including transmissive and shielding portions "C" and "D" is disposed over the organic layer 88. The transmissive portion "C" corresponds to the black matrix 82. After the light is irradiated onto the organic layer 88 through the mask "M", the organic layer 88 is developed. Since a portion of the organic layer 88 corresponding to the shielding portion "D" is not exposed to the light, the unexposed portion is eliminated and a patterned spacer 90 of a desired shape is obtained, as shown in FIG. 4B.

FIGS. 5A and 5B are schematic cross-sectional views showing a fabricating method of a patterned spacer using a positive type photosensitive organic layer according to the related art.

In FIG. 5A, a black matrix 82 is formed on a substrate 80 and a color filter layer 84 including red, green, and blue sub-color filters 84a, 84b, and 84c is formed on the black matrix 82. Each sub-color filter 84a, 84b, and 84c corresponds to a space between the adjacent black matrices 82. A transparent common electrode 86 is formed on the color filter layer 84 and an organic layer 88 is formed on the common electrode 86 through coating a positive type photosensitive organic material (i.e., a positive photoresist).

A mask "M" including transmissive and shielding portions "C" and "D" is disposed over the organic layer 88. The shielding portion "D" corresponds to the black matrix 82. After the light is irradiated onto the organic layer 88 through the mask "M", the organic layer 88 is developed. Since a portion of the organic layer 88 corresponding to the shielding portion "D" is not exposed to the light, the unexposed portion remains and a patterned spacer 90 of a desired shape is obtained, as shown in FIG. 5B.

The patterned spacer 90 has different shapes depending on the type of the organic layer 88.

FIGS. 6A and 6B are schematic cross-sectional views showing a shape of a patterned spacer using a positive type photosensitive organic layer according to the related art, and FIGS. 7A and 7B are schematic cross-sectional views showing a shape of a patterned spacer using a negative type photosensitive organic layer according to the related art.

In FIG. 6A, after a positive type photosensitive organic layer 88 (i.e., a positive photoresist) is formed on a substrate 80, a mask "M" including transmissive and shielding portions "C" and "D" is disposed over the photosensitive organic layer 88. When light "L" is irradiated onto the mask "M", the light passing through the transmissive portion "C" is diffracted at a boundary of the shielding portion "D" toward an inner portion of the shielding portion "D". Accordingly, a portion of the photosensitive organic layer 88 corresponding to the shielding portion "D" is exposed to the diffracted light. As a result, after the photosensitive organic layer 88 is developed, a patterned spacer 90 of a round shape is obtained, as shown in FIG. 6B.

In FIG. 7A, after a negative type photosensitive organic layer 88 (i.e., a negative photoresist) is formed on a substrate 80, a mask "M" including transmissive and shielding portions "C" and "D" is disposed over the photosensitive organic layer 88. When light "L" is irradiated onto the mask "M", the light passing through the transmissive portion "C" is diffracted at a boundary of the shielding portion "D" toward an outer portion of the transmissive portion "C". Accordingly, a portion of the photosensitive organic layer 88 corresponding to the shielding portion "D" is exposed to the diffracted light. As a result, after the photosensitive organic layer 88 is developed, a patterned spacer 90 having a width greater than a desired width is obtained, as shown in FIG. 7B.

The black matrix 21, as shown in FIG. 1, corresponds to the gate line 5, the data line 17, and the TFT "T" in a reflective LCD device. Since the black matrix 21 is designed to include an alignment margin reflecting upon an attachment error of the first and second substrates 6 and 23, the black matrix 21 has an area larger than that of the gate line 5, the data line 17, and the TFT "T".

FIG. 8 is a schematic cross-sectional view taken along line VIII-VIII of FIG. 1, and FIG. 9 is a schematic magnified view of portion "F" of FIG. 8.

In FIGS. 8 and 9, first and second substrates 6 and 23 face into and are spaced apart from each other. A first insulating layer 10 is formed on an inner surface of the first substrate 6, and a data line 17 is formed on the first insulating layer 10. The data line 17 is disposed between adjacent first and second pixel regions "P1" and "P2". A thin film transistor (TFT) "T" is also formed on the first substrate 6, and a second insulating layer 16 is formed on the TFT "T" and the data line 17. A reflective electrode 18 is formed on the second insulating layer 16. A black matrix 21 is formed on an inner surface of the second substrate 23, and a color filter layer 22 including red, green, and blue sub-color filters 22a, 22b, and 22c is formed on the black matrix 21. The black matrix 21 corresponds to the data line 17, and each sub-color filter 22a, 22b, and 22c corresponds to the each pixel region "P1" and "P2".

A patterned spacer 30 having a round shape is formed between the reflective electrode 18 and the common electrode 23. When a distance between the adjacent reflective electrodes 18 over the data line 17 is "a", the black matrix 21 is formed such that a width of the black matrix 21 is "a+2b", which is greater than "a", where "b" is a length of an overlapped portion of the reflective electrode 18 and the black matrix 21. Contrary to a liquid crystal layer 20 over the reflective electrode 18, a uniform electric field is not sufficiently applied to a liquid crystal layer 20 corresponding to "a". Thus, light can pass through the liquid crystal layer 20 corresponding to "a" even when a voltage for black state is applied to the reflective electrode 18 in a normally white mode. Accordingly, the portion corresponding to "a" should be shielded with the black matrix 21, and the minimum width of the black matrix 21 is "a". However, since the first and second substrates 6 and 23 are attached with a misalignment, the width of the black matrix should be determined while taking an alignment margin into consideration. Therefore, the width of the black matrix 21 is designed to be "a+2b", which is greater than "a". As the width of the black matrix 21 increases, an effective reflection area is reduced. Accordingly, aperture ratio and brightness are also reduced.

SUMMARY OF THE INVENTION

Accordingly, the present invention is directed to a reflective liquid crystal display device and a fabricating method thereof that substantially obviate one or more of problems due to limitations and disadvantages of the related art.

Another object of the present invention is to provide a reflective liquid crystal display device including a patterned spacer and a fabricating method thereof.

Another object of the present invention is to provide a reflective liquid crystal display device and a fabricating method thereof having high aperture ratio, high brightness, and low cost.

A further object of the present invention is to provide a reflective liquid crystal display device and a fabricating method thereof in which a data line is formed under a reflective electrode, and a patterned spacer corresponding to a gap between adjacent reflective electrodes is formed by using a negative photoresist and rare exposure.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes a substrate having first and second pixel regions, a gate line on the substrate, a data line crossing the gate line and defining the pixel regions, a thin film transistor connected to the gate line and the data line, wherein the thin film transistor comprises a gate electrode, an active layer, and source and drain electrodes, first and second reflective electrodes over the thin film transistor, wherein the first and second reflective electrodes are separated from each other by a first gap, the first and second reflective electrodes located at the first and second pixel regions, respectively, and completely cover the data line at the pixel regions, and a patterned spacer filling the first gap between the first and second reflective electrodes.

In another aspect of the present invention, a method of fabricating a reflective liquid crystal display device includes forming a gate line on a substrate having first and second pixel regions, forming a data line crossing the gate line and defining the pixel regions, forming a thin film transistor connected to the gate line and the data line, wherein the thin film transistor comprises a gate electrode, an active layer, and source and drain electrodes, forming first and second reflective electrodes over the thin film transistor, wherein the first and second reflective electrodes are separated from each other by a first gap, the first and second reflective electrodes located at the first and second pixel regions, respectively, and completely cover the data line at the pixel regions, forming a photosensitive organic layer on an entire surface of the substrate having the first and second reflective electrodes, and forming a patterned spacer filling the first gap between the first and second reflective electrodes by sequentially exposing and developing the photosensitive organic layer, wherein the photosensitive organic layer is exposed to light passing through the first gap.

In another aspect of the present invention, a reflective liquid crystal display device includes first and second substrates facing into and spaced apart from each other, the first and second substrates having first and second pixel regions, respectively, a gate line on an inner surface of the first substrate, a data line crossing the gate line and defining the first and second pixel regions, a thin film transistor connected to the gate line and the data line, wherein the thin film transistor comprises a gate electrode, an active layer, and source and drain electrodes, first and second reflective electrodes over the thin film transistor, wherein the first and second reflective electrodes are separated from each other by a first gap, the first and second reflective electrodes are located at the first and second pixel regions, respectively, and completely cover the data line at the pixel regions, a color filter layer on an inner surface of the second substrate, a common electrode on the color filter layer, a liquid crystal layer between the first and second reflective electrodes and the common electrode, and a patterned spacer filling the first gap between the first and second reflective electrodes, the patterned spacer contacting the common electrode.

In a further aspect of the present invention, a method of fabricating a reflective liquid crystal display device includes forming a gate line on a first substrate having first and second pixel regions, forming a data line crossing the gate line and defining the first and second pixel regions, forming a thin film transistor connected to the gate line and the data line, wherein the thin film transistor comprises a gate electrode, an active layer, and source and drain electrodes, forming first and second reflective electrodes over the thin film transistor, wherein the first and second reflective electrodes are separated from each other by a first gap, the first and second reflective electrodes are located at the first and second pixel regions, respectively, and completely cover the data line at the pixel regions, forming a photosensitive organic layer on an entire surface of the substrate having the first and second reflective electrodes, forming a patterned spacer filling the first gap between the first and second reflective electrodes by sequentially exposing and developing the photosensitive organic layer, wherein the photosensitive organic layer is exposed to light passing through the first gap, forming a color filter layer on a second substrate, forming a common electrode on the color filter layer, attaching the first and second substrates such that the first and second reflective electrodes face into the common electrode, and forming a liquid crystal layer between the first and second reflective electrodes and the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
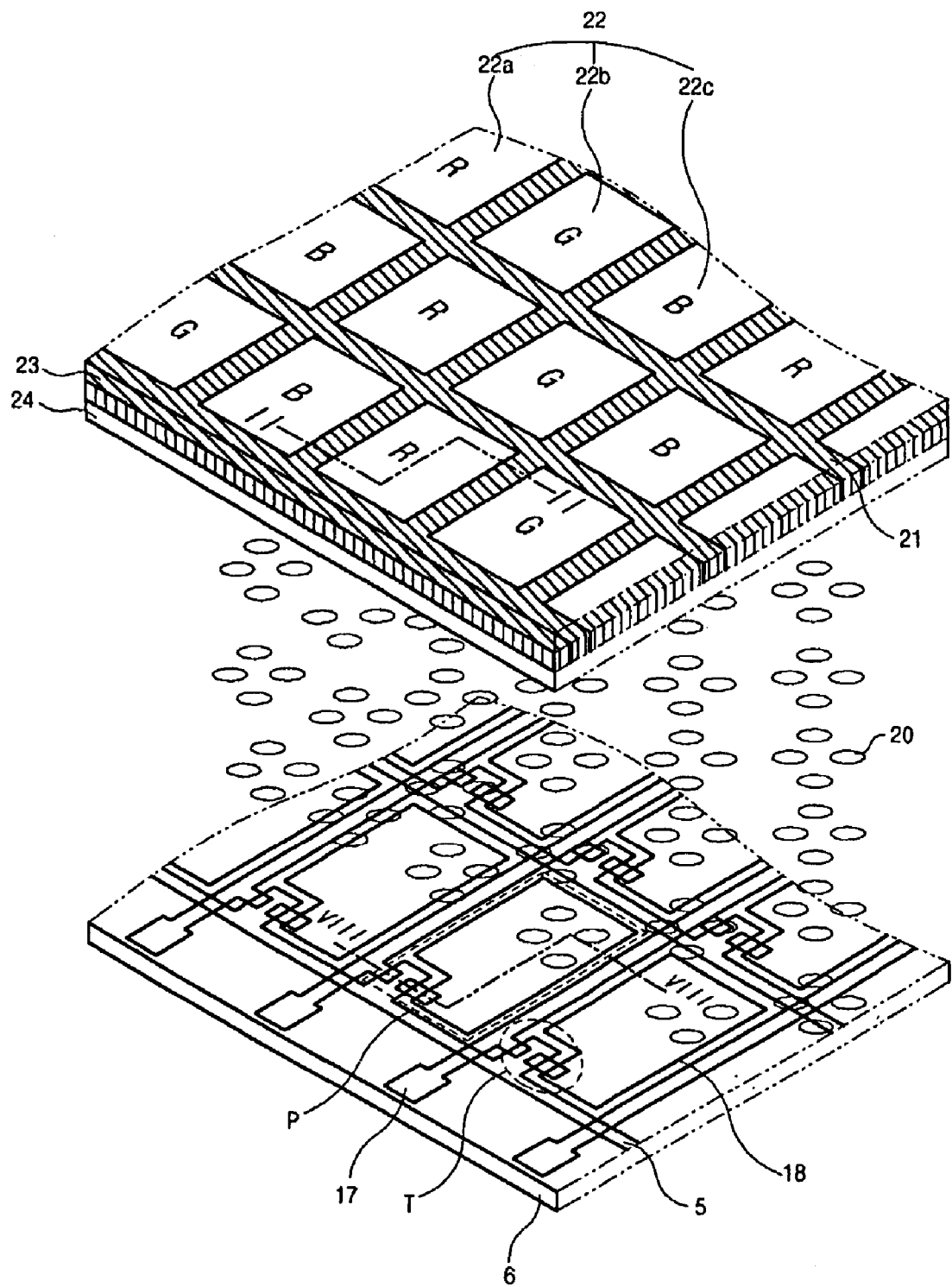
FIG. 1 is a schematic perspective view of a reflective liquid crystal display device according to a related art.
Figure 2:
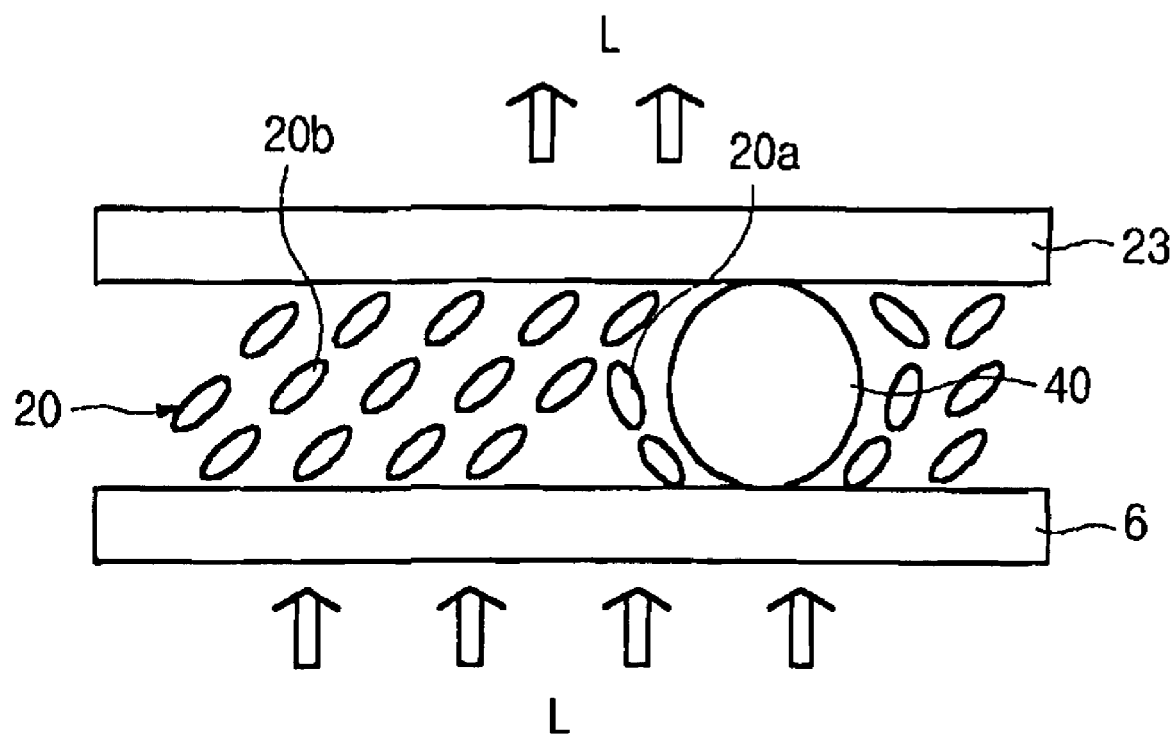
FIG. 2 is a schematic cross-sectional view showing a spacer of a liquid crystal display device according to the related art.
Figure 3:
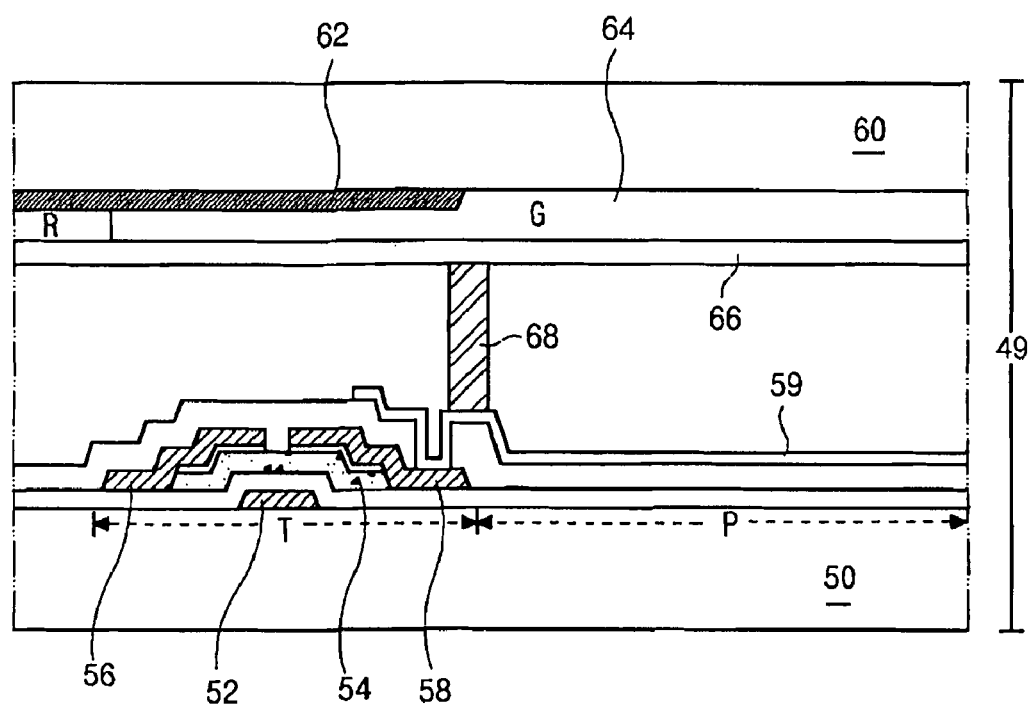
FIG. 3 is a schematic cross-sectional view of a liquid crystal display device including a patterned spacer according to the related art.
Figure 4A:
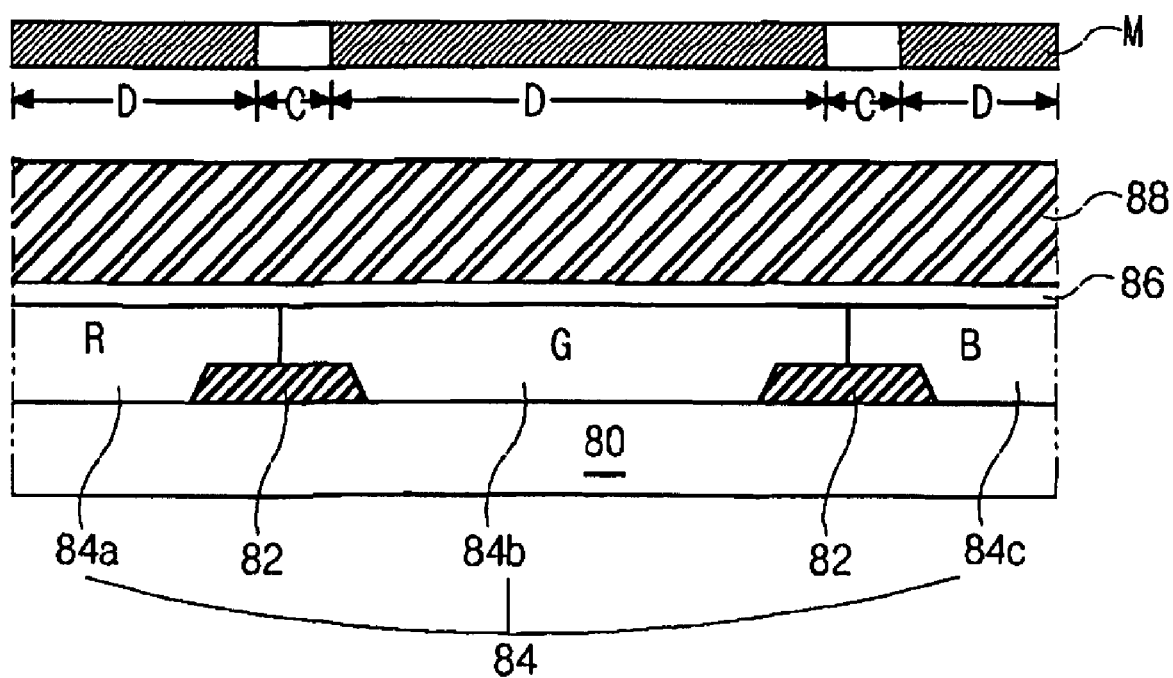
FIGS. 4A and 4B are schematic cross-sectional views showing a fabricating method of a patterned spacer using a negative type photosensitive organic layer according to the related art.
Figure 4B:
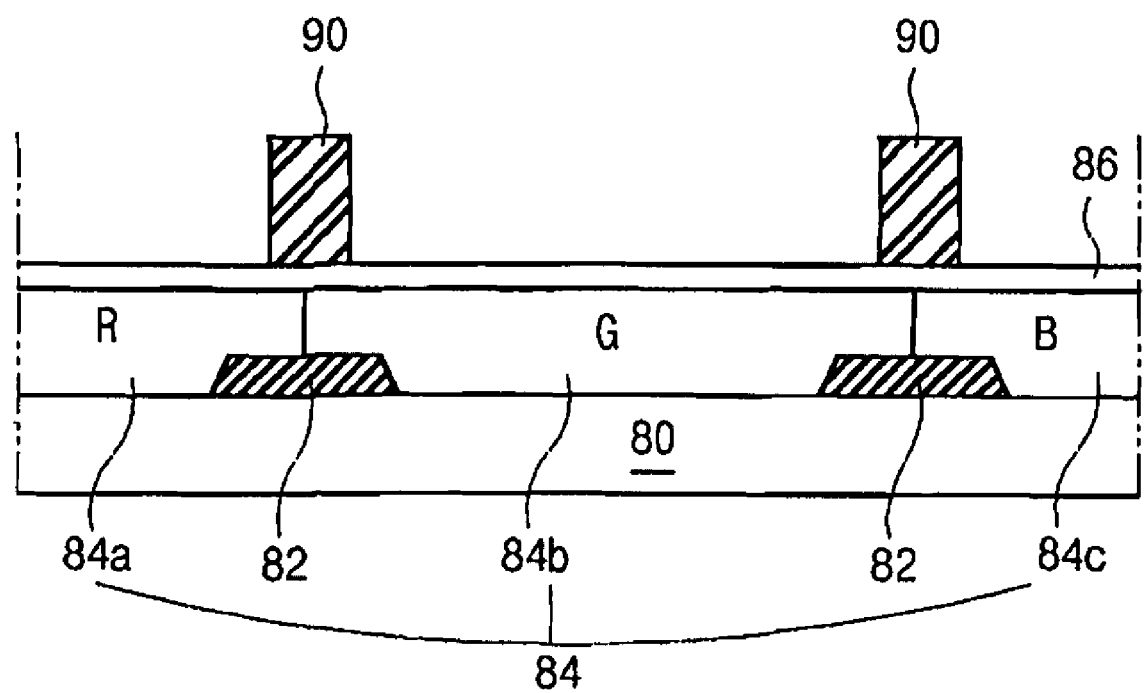
Figure 5A:
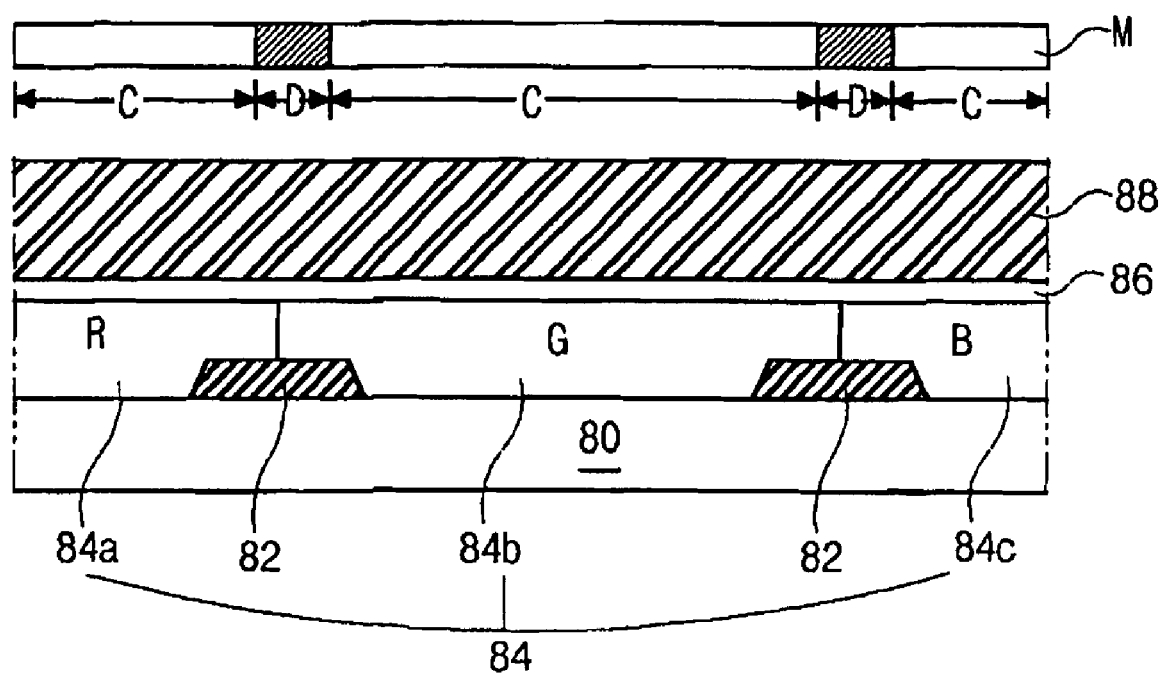
FIGS. 5A and 5B are schematic cross-sectional views showing a fabricating method of a patterned spacer using a positive type photosensitive organic layer according to the related art.
Figure 5B:
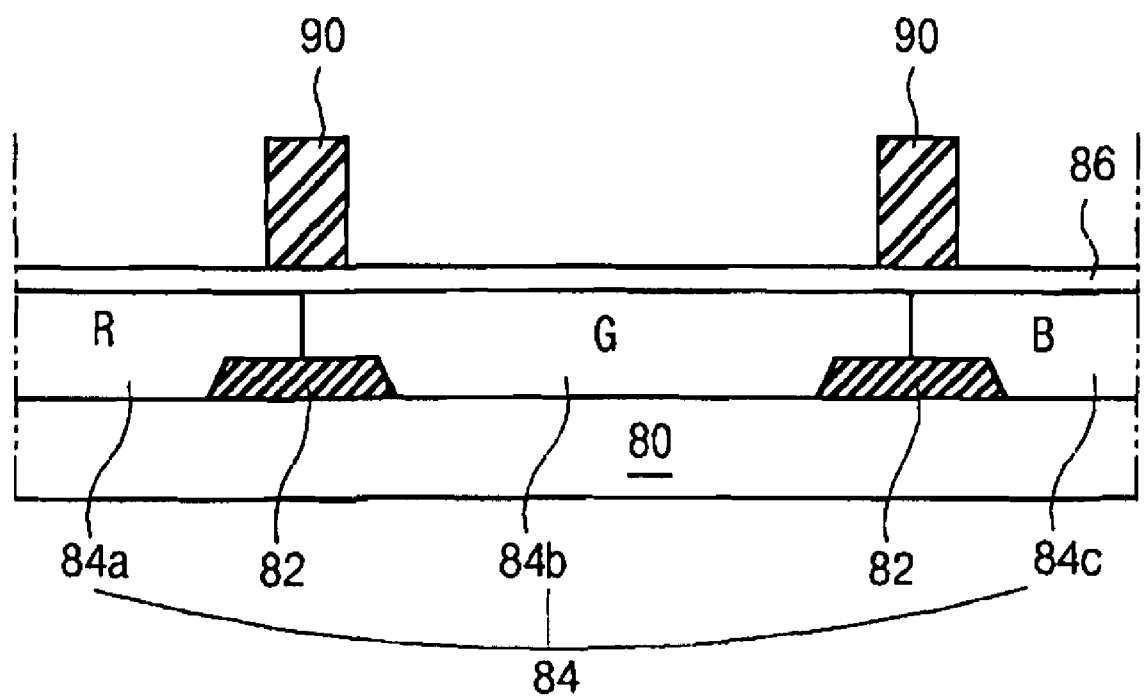
Figure 6A:
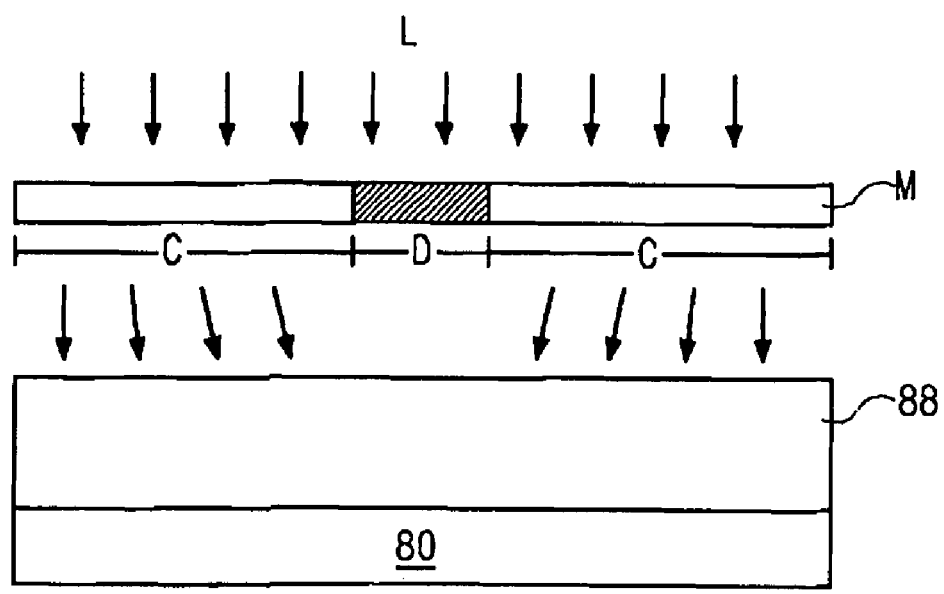
FIGS. 6A and 6B are schematic cross-sectional views showing a shape of a patterned spacer using a positive type photosensitive organic layer according to the related art.
Figure 6B:
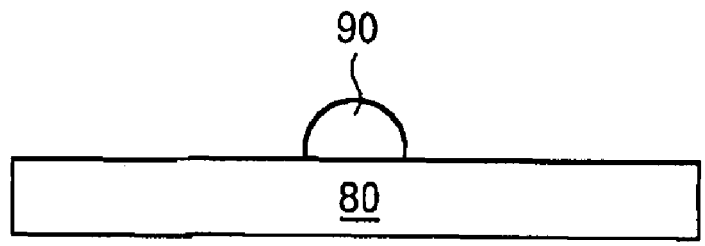
Figure 7A:
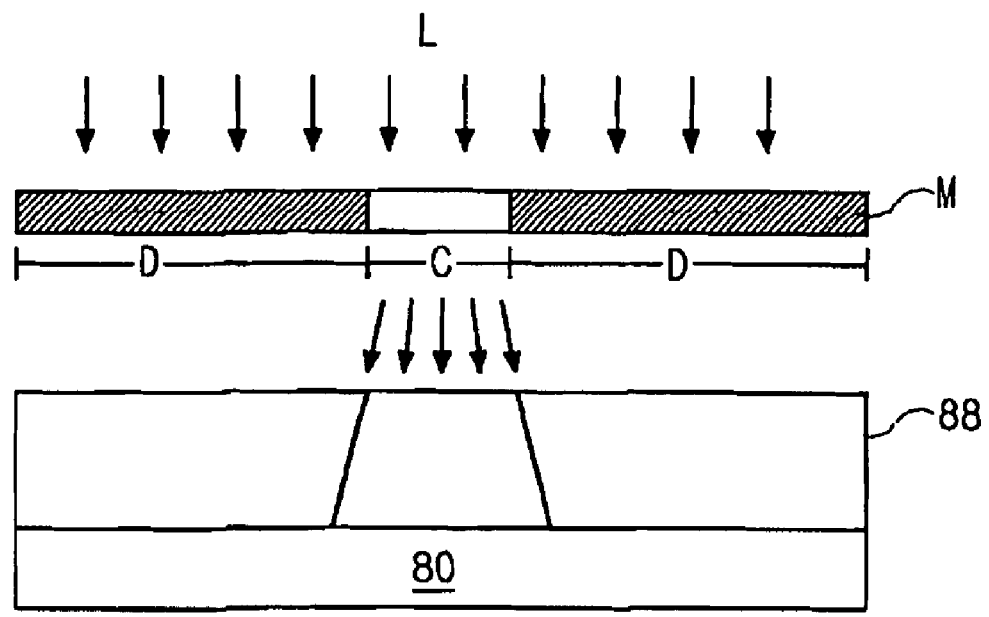
FIGS. 7A and 7B are schematic cross-sectional views showing a shape of a patterned spacer using a negative type photosensitive organic layer according to the related art.
Figure 7B:
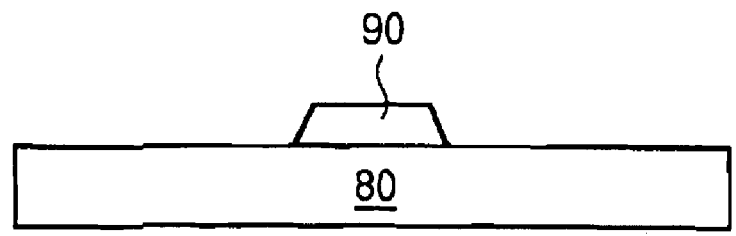
Figure 8:
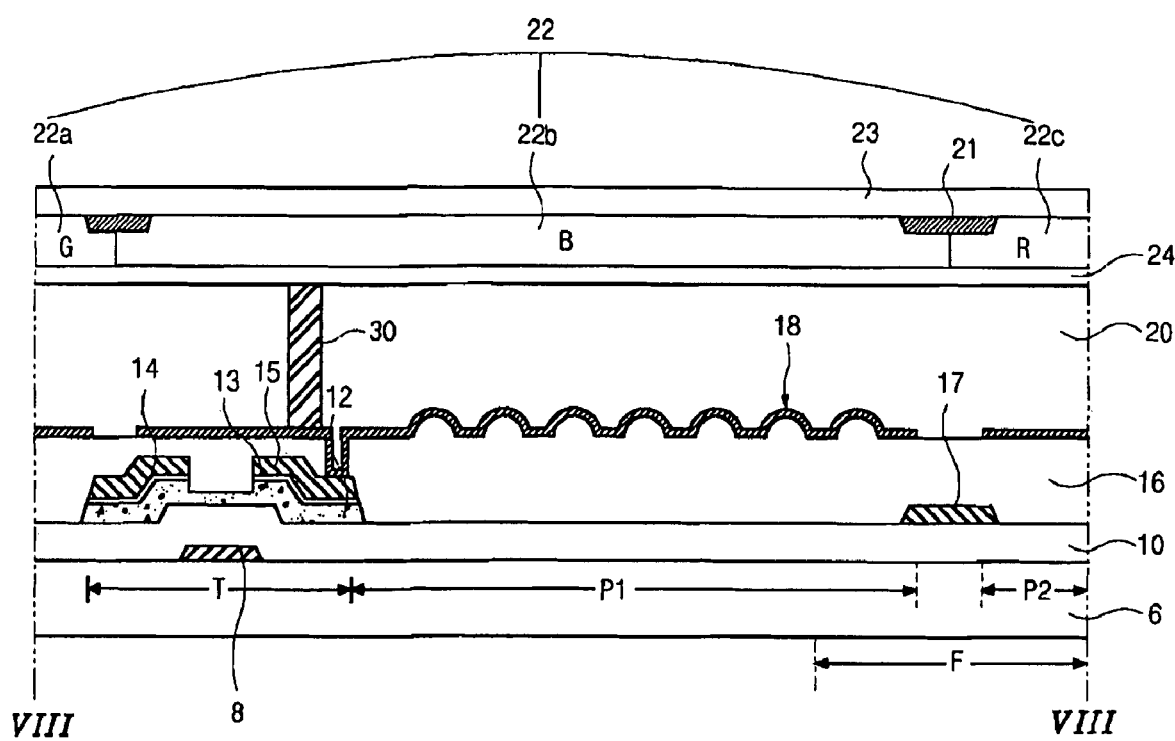
FIG. 8 is a schematic cross-sectional view taken along line VIII-VIII of FIG. 1.
Figure 9:
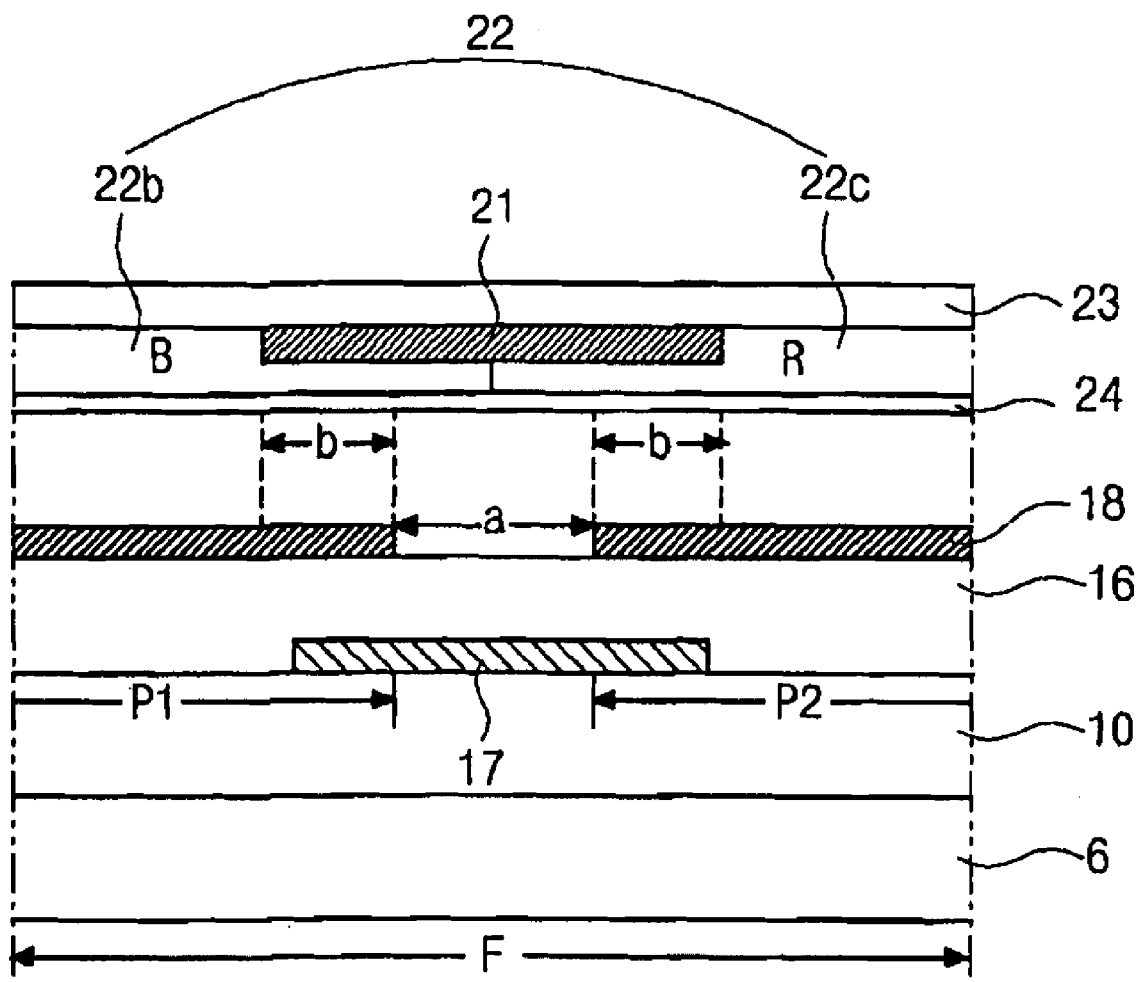
FIG. 9 is a schematic magnified view of portion "F" of FIG. 8.
Figure 10:
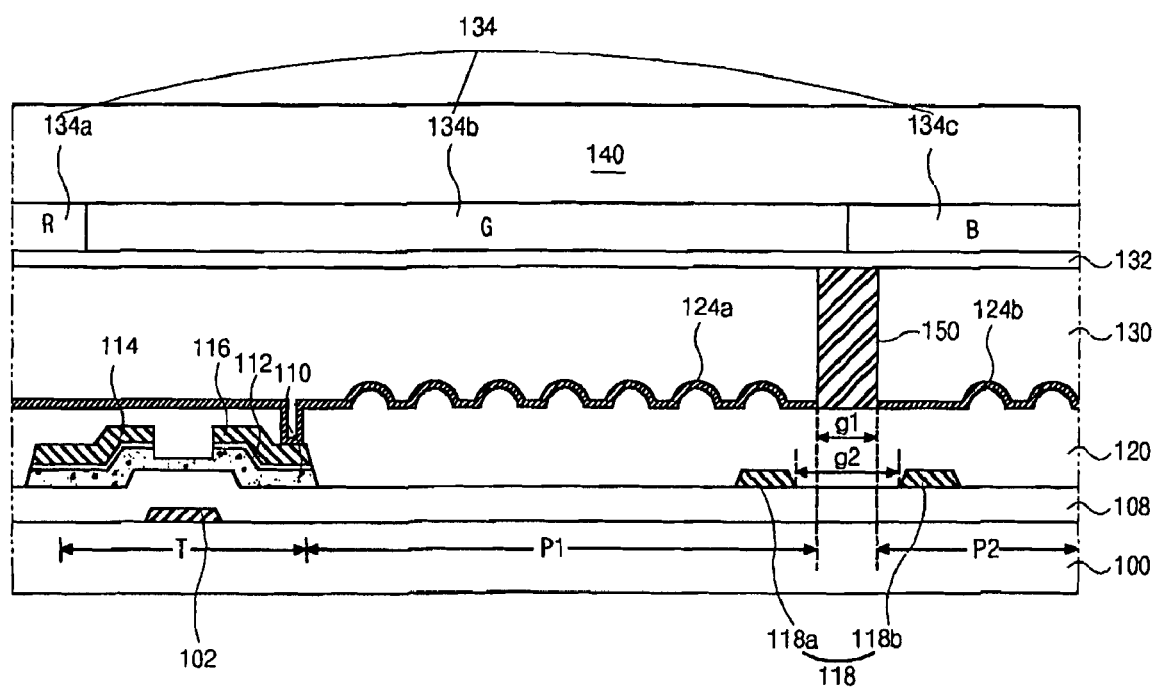
FIG. 10 is a schematic cross-sectional view of a reflective liquid crystal display device according to the present invention.

FIG. 10 is a schematic cross-sectional view of a reflective liquid crystal display device according to the present invention.

In FIG. 10, first and second substrates 100 and 140 face into and are spaced apart from each other. A thin film transistor (TFT) "T", a gate line (not shown), and a data line 118 having first and second branch lines 118a and 118b are formed on the inner surface of the first substrate 100. The TFT "T" includes a gate electrode 102, an active layer 110, an ohmic contact layer 112, and source and drain electrodes 114 and 116. The data line 118 and the gate line (not shown) are connected to the source electrode 114 and the gate electrode 102, respectively. The data line 118 and the gate line (not shown) cross each other and define first and second pixel regions "P1" and "P2". A passivation layer 120 is formed on the TFT "T" and the data line 118.

First and second reflective electrodes 124a and 124b are formed on the passivation layer 120 corresponding to the first and second pixel regions "P1" and "P2", respectively. The first reflective electrode 124a is connected to the drain electrode 116. Similarly, the second reflective electrode 124b is connected to the adjacent drain electrode (not shown) of the second pixel region "P2". The first and second reflective electrodes 124a and 124b are spaced apart from each other by a first gap "g1". Each of the first and second reflective electrodes 124a and 124b may have uneven surfaces to improve brightness. The uneven surfaces of each of the first and second reflective electrodes 124a and 124b can be obtained by forming the passivation layer 120 having an uneven surface.

The data line 118 includes the first and second branch lines 118a and 118b separated by a second gap "g2". The first and second branch lines 118a and 118b are formed under the first and second reflective electrodes 124a and 124b, respectively. More specifically, the first and second reflective electrodes 124a and 124b completely cover the first and second branch lines 118a and 118b, respectively.

A color filter layer 134 including red, green, and blue sub-color filters 134a, 134b, and 134c corresponding to the pixel regions are formed on the inner surface of the second substrate 140. A transparent common electrode 132 is formed on the inner surface of the color filter layer 134. A patterned spacer 150 such as a columnar shape is formed over the first gap "g1" between the first and second reflective electrodes 124a and 124b. The patterned spacer 150 maintains a cell gap. In addition, since the patterned spacer 150 is formed of an opaque material, the patterned spacer 150 also functions as a black matrix. Accordingly, an additional black matrix is not necessary and an area for the black matrix is reduced, thereby increasing an aperture ratio. Moreover, since the patterned spacer 150 shields the light passing through the first gap "g1", the reduction of a contrast ratio may be prevented.

Figure 11:
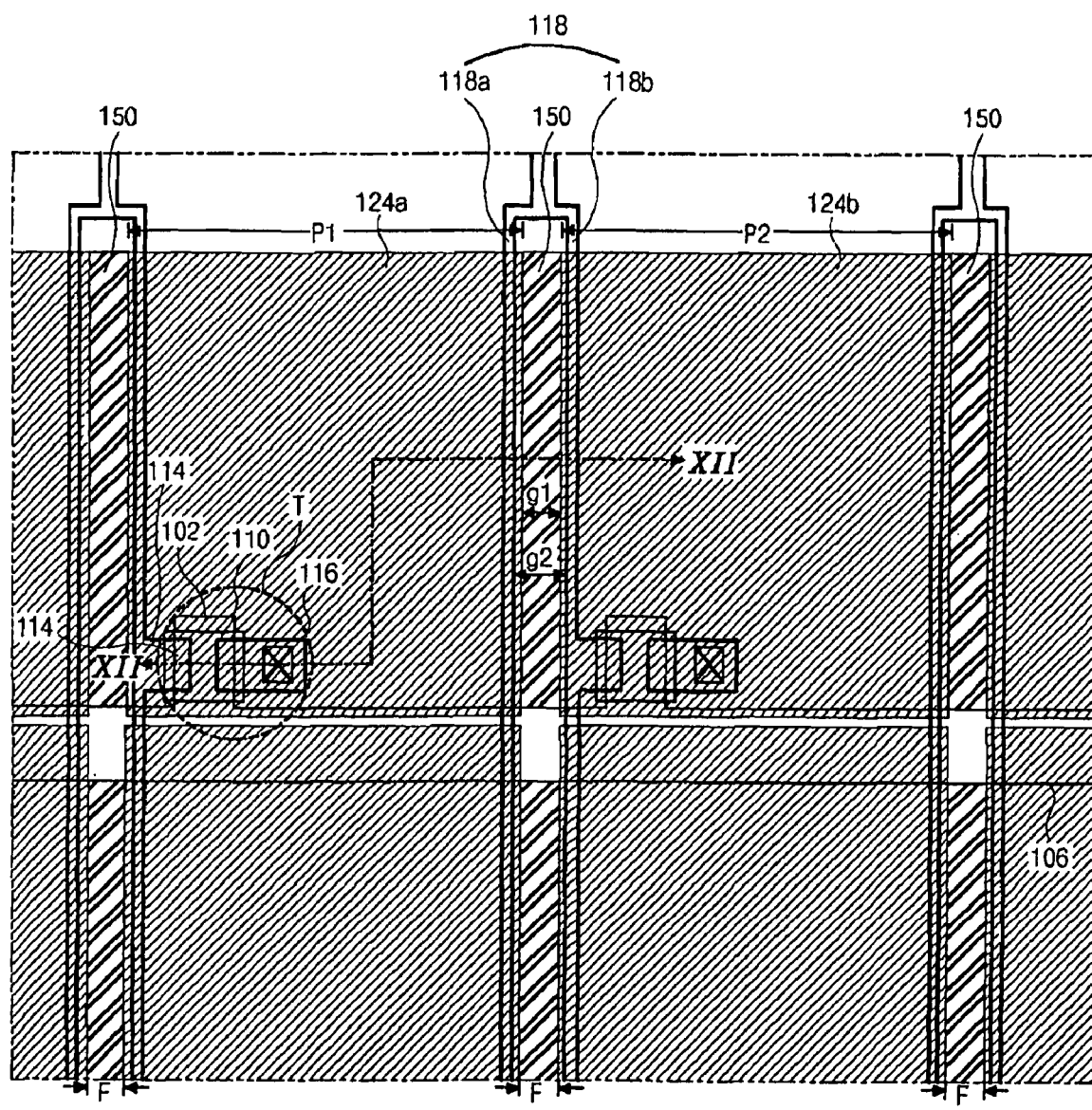
FIG. 11 is a schematic plane view of an array substrate for the reflective liquid crystal display device according to the present invention.

FIG. 11 is a schematic plane view of an array substrate for the reflective liquid crystal display device according to the present invention.

In FIG. 11, a gate line 106 and a data line 118 cross each other and define first and second pixel regions "P1" and "P2". A thin film transistor (TFT) "T" including a gate electrode 102, an active layer 110, and source and drain electrodes 114 and 116 is formed at each intersection of the gate line 106 and the data line 118. The gate electrode 102 is connected to the gate line 106, and the source electrode 114 is connected to the data line 118. First and second reflective electrodes 124a and 124b are formed in the first and second pixel regions "P1" and "P2", respectively. The first and second reflective electrodes 124a and 124b are separated from each other by a first gap "g1". The first reflective electrode 124a is connected to the drain electrode 116. Similarly, the second reflective electrode 124b is connected to the drain electrode of an adjacent TFT in the second pixel region "P2". The data line 118 includes first and second branch lines 118a and 118b separated from each other by a second gap "g2" at the edge of the substrate. The first and second branch lines 118a and 118b are formed under the first and second reflective electrodes 124a and 124b, respectively. More specifically, the first and second reflective electrodes 124a and 124b completely cover the first and second branch lines 118a and 118b, respectively. The first branch line 118a has the same width and length as the second branch line 118b to maintain symmetry of the first and second pixel regions "P1" and "P2". Since a data signal flows through both the first and second branch lines 118a and 118b, the width of each of the first and second branch lines 118a and 118b can be reduced.

A patterned spacer 150 is formed over the first gap "g1" between the first and second reflective electrodes 124a and 124b. Since the patterned spacer 150 is formed by using the gate line 106 and the first and second reflective electrodes 124a and 124b as masks, the patterned spacer 150 is not formed over the gate line 106 and the first and second reflective electrodes 124a and 124b. The first and second branch lines 118a and 118b may be connected at one or more connecting portions (not shown) over the gate line 106.

FIGS. 12A to 12F are schematic cross-sectional views taken along line XII-XII of FIG. 11, showing the fabricating process of an array substrate for the reflective liquid crystal display device according to the present invention.

Figure 12A:
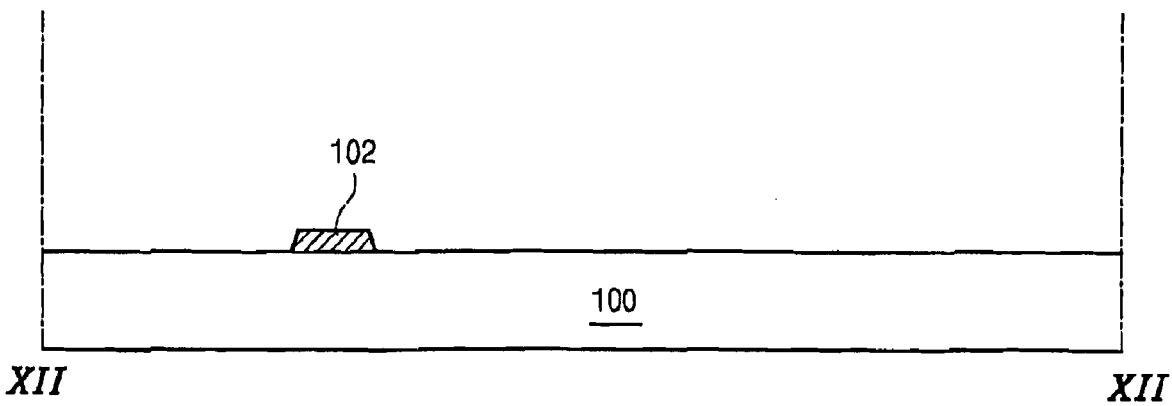
FIGS. 12A to 12F are schematic cross-sectional views taken along line XII-XII of FIG. 11, showing a fabricating process of an array substrate for the reflective liquid crystal display device according to the present invention.

In FIG. 12A, a gate electrode 102 and a gate line 106 (shown in FIG. 11) are formed on a substrate 100. The gate electrode 102 and the gate line 106 are formed of aluminum (Al) to reduce a resistance-capacitance (RC) delay. However, pure aluminum (Al) is chemically susceptible and occurs a line defect due to a hillock in the subsequent high temperature process. Accordingly, a double layer of aluminum/molybdenum (Al/Mo) may be used as the gate electrode 102 and the gate line 106.

Figure 12B:
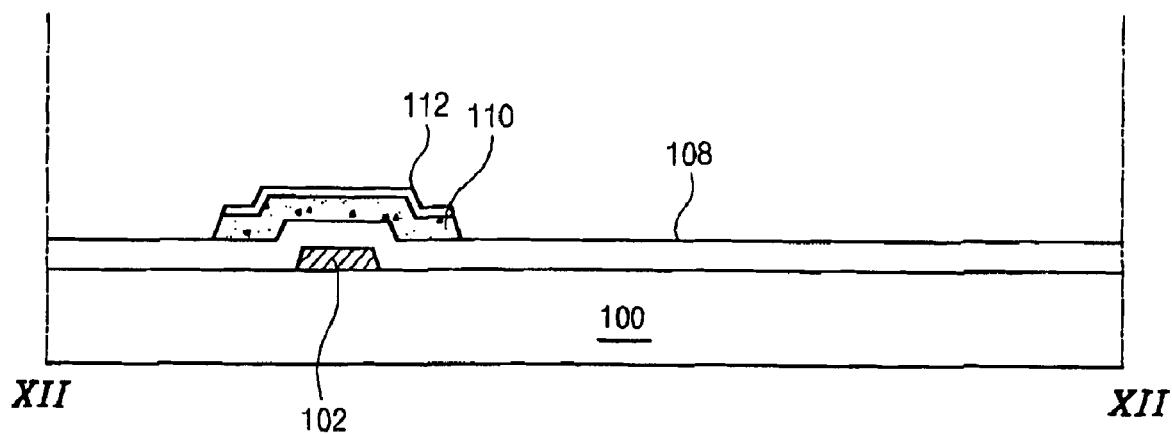

In FIG. 12B, a gate insulating layer 108 is formed on the gate electrode 102 and the gate line 106 by depositing an inorganic insulating material such as silicon nitride (SiN.sub.x) and silicon oxide (SiO.sub.2). An active layer 110 of amorphous silicon (a-Si:H) and an ohmic contact layer 112 of impurity-doped amorphous silicon (n+a-Si:H) are sequentially formed on the gate insulating layer 108 over the gate electrode 102. The active layer 110 and the ohmic contact layer 112 have an island shape.

Figure 12C:
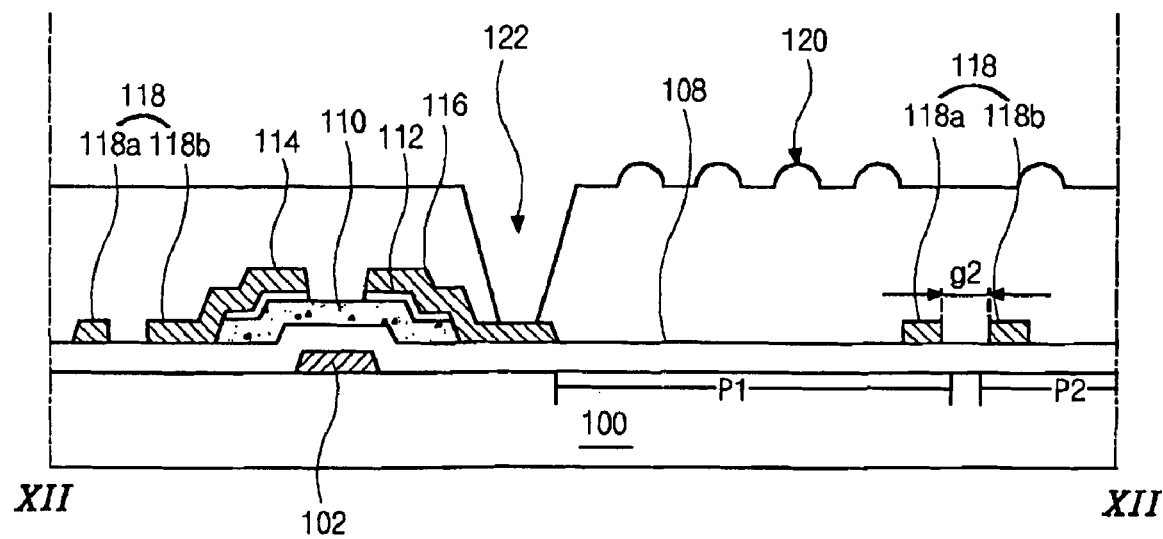

In FIG. 12C, source and drain electrodes 114 and 116 are formed on the ohmic contact layer 112 by depositing and patterning a conductive metallic material, such as chromium (Cr), molybdenum (Mo), antimony (Sb), and titanium (Ti). At the same time, a data line 118 including first and second branch lines 118a and 118b is formed on the gate insulating layer 108. The first and second branch lines 118a and 118b separated from each other by a second gap "g2" at the edge of the substrate 100 are formed in the adjacent first and second pixel regions "P1" and "P2", respectively. The first and second branch lines 118a and 118b may be connected at one or more connecting portions (not shown) over the gate line 106. A passivation layer 120 is formed on the source and drain electrodes 114 and 116 and the data line 118 by depositing an organic material group, such as benzocyclobutene (BCB) and acrylic resin. The passivation layer 120 has a drain contact hole 122 exposing the drain electrode 116. The passivation layer 120 has an uneven surface in the first and second pixel regions "P1" and "P2".

Figure 12D:
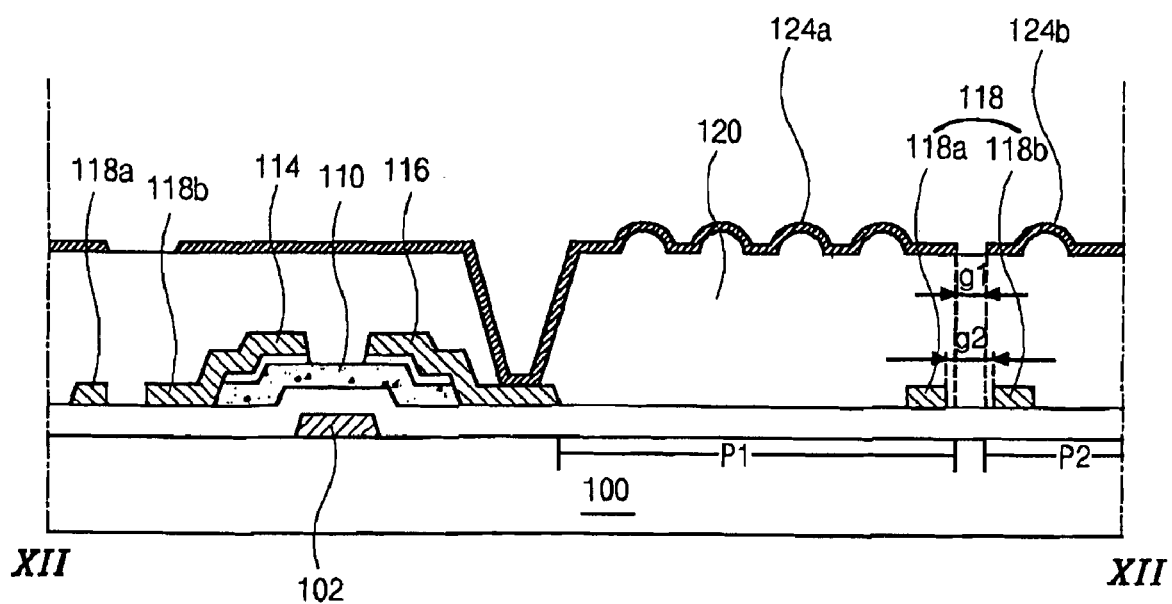

In FIG. 12D, first and second reflective electrodes 124a and 124b are formed on the passivation layer 120 in the first and second pixel regions "P1" and "P2", respectively. The first reflective electrode 124a is connected to the drain electrode 114 through the drain contract hole 122. Similarly, the second reflective electrode 124b is connected to the drain electrode (not shown) of an adjacent TFT (not shown) corresponding to the second pixel region "P2". The first and second reflective electrodes 124a and 124b are separated from each other by a first gap "g1". The first and second reflective electrodes 124a and 124b may be formed of a conductive material, such as silver (Ag), aluminum (Al), and aluminum (Al) alloy having low resistance and high reflectance. Moreover, since the first and second reflective electrodes 124a and 124b have the uneven top surface because it is directly formed on the uneven surface of the passivation layer 120, high reflectance and a wide viewing angle can be obtained. The first and second reflective electrodes 124a and 124b completely cover the first and second branch lines 118a and 118b, respectively. Accordingly, an additional black matrix for preventing the reflected light from the data line is not necessary and an aperture ratio can be improved.

Figure 12E:
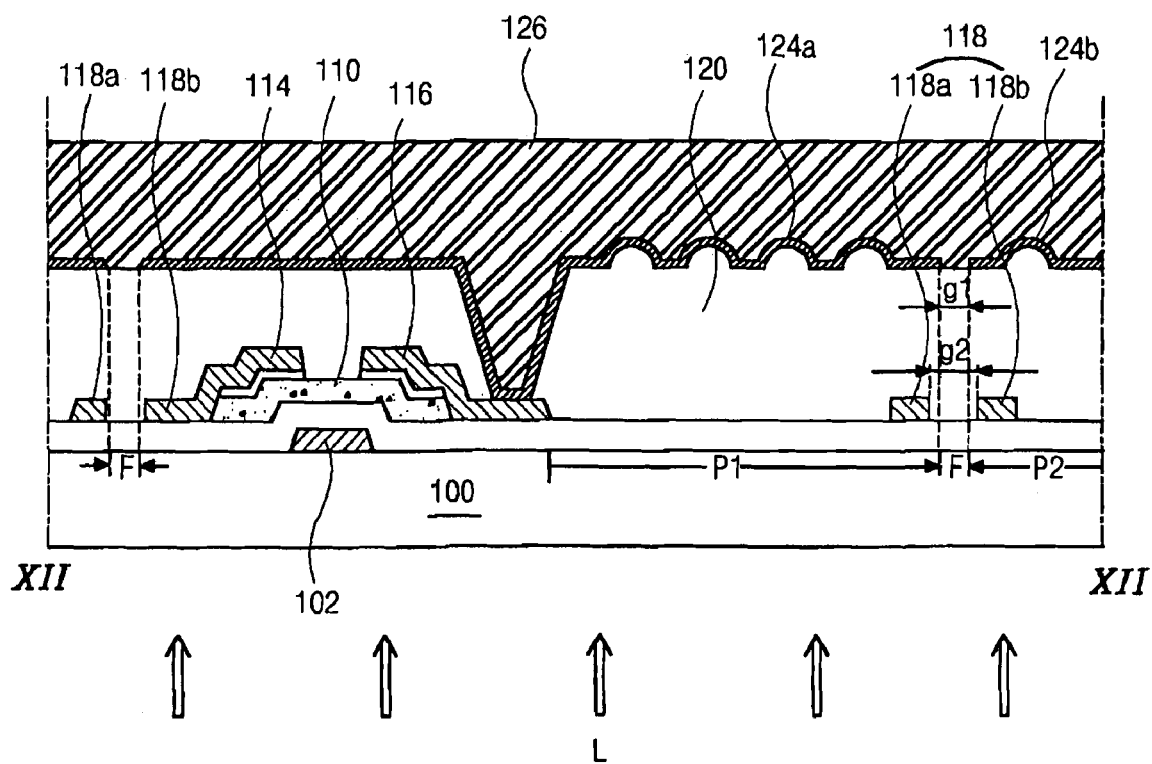

In FIG. 12E, a photosensitive organic layer 126 is formed on the first and second reflective electrodes 124a and 124b by depositing a photoresist layer having a negative type. Then, light "L" is irradiated onto the photosensitive organic layer 126 through the first gap "g1". That is, since the light "L" is emitted from a light source (not shown) under the substrate 100 toward the photosensitive organic layer 126, only a portion of the photosensitive organic layer 126 exposed between the first and second reflective electrodes 124a and 124b absorbs the light "L" and remains after the subsequent developing process.

Figure 12F:
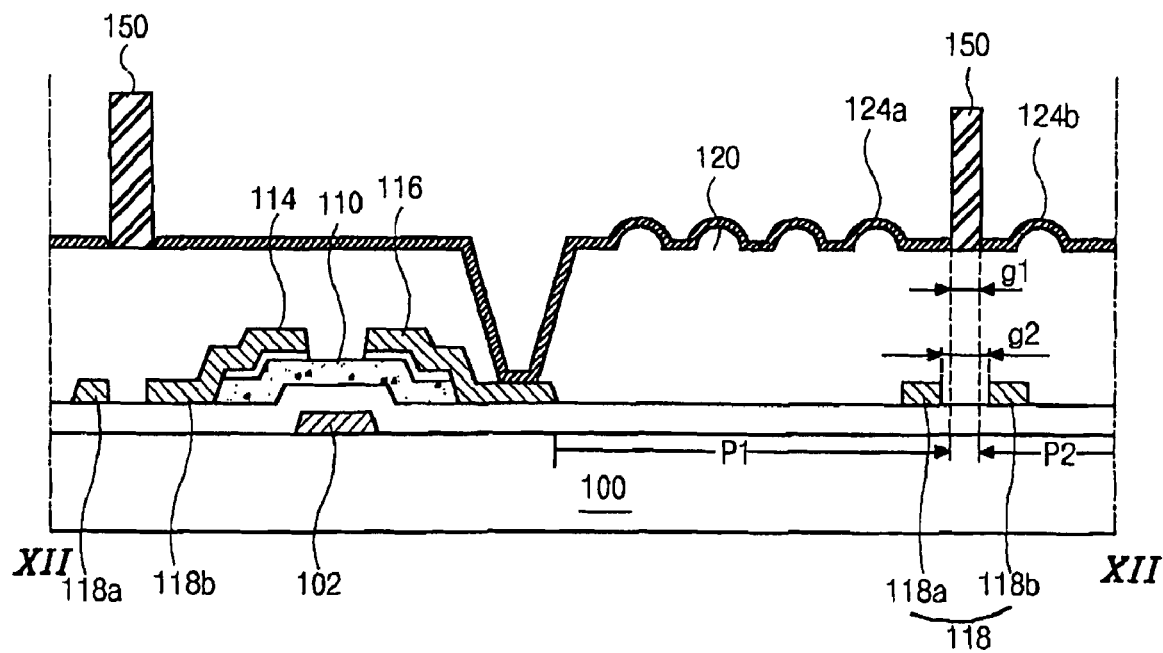

In FIG. 12F, a patterned spacer 150 is obtained on the passivation layer 120 corresponding to the first gap "g1" by developing the photosensitive organic layer 126 (shown in FIG. 12E).

Since the data line including first and second branch lines is formed under a reflective electrode in the present invention, an additional black matrix is not necessary and an aperture ratio increases. Moreover, since the patterned spacer is formed between the adjacent reflective electrodes, an aperture ratio can be more improved. Additionally, the patterned spacer stably maintains a cell gap. A high contrast ratio can be obtained because the patterned spacer prevents a light leakage scattered at the uneven surface of the reflective electrode.

It will be apparent to those skilled in the art that various modifications and variations can be made in the reflective liquid crystal display device and the fabricating method thereof of the present invention without departing from the spirit or scope of the inventions. Thus, it is intended that the present invention covers the modifications and variations of this invention provided they come within the scope of the appended claims and their equivalents.

What is claimed is:

1. A method of fabricating a reflective liquid crystal display device, comprising:
    forming a gate line on a substrate having first and second pixel regions;
    forming a data line crossing the gate line and defining the pixel regions;
    forming a thin film transistor connected to the gate line and the data line, wherein the thin film transistor comprises a gate electrode, an active layer, and source and drain electrodes;
    forming first and second reflective electrodes over the thin film transistor, wherein the first and second reflective electrodes are separated from each other by a first gap, the first and second reflective electrodes are located at the first and second pixel regions, respectively, and completely cover the data line at the pixel regions;
    forming a photosensitive organic layer on an entire surface of the substrate having the first and second reflective electrodes; and
    forming a patterned spacer filling the first gap between the first and second reflective electrodes by sequentially exposing and developing the photosensitive organic layer, wherein the photosensitive organic layer is exposed to light passing through the first gap.

2. The method according to claim 1, wherein the photosensitive organic layer includes a negative photoresist.

3. The method according to claim 1, wherein the substrate has a first surface where the first and second reflective electrodes are formed and a second surface facing into the first surface, wherein the light passing through the first gap is emitted from an outside of the second surface.

4. The method according to claim 1, wherein the data line comprises first and second branch lines separated from each other by a second gap, wherein the first and second reflective electrodes completely cover the first and second branch lines, respectively.

5. The method according to claim 4, wherein the first reflective electrode and the first branch line has a first overlapping area substantially the same as a second overlapping area formed by the second reflective electrode and the second branch line.

6. The method according to claim 1, wherein the first and second reflective electrodes are connected to the drain electrode, the gate electrode is connected to the gate line, and the source electrode is connected to the data line.

7. The method according to claim 1, wherein the first and second reflective electrodes are formed of one of silver (Ag), aluminum (Al), and aluminum (Al) alloy.

8. The method according to claim 1, wherein the first and second reflective electrodes has an uneven surface in the first and second pixel regions, respectively.

9. A method of fabricating a reflective liquid crystal display device, comprising:
    forming a gate line on a first substrate having first and second pixel regions;
    forming a data line crossing the gate line and defining the first and second pixel regions;
    forming a thin film transistor connected to the gate line and the data line, wherein the thin film transistor comprises a gate electrode, an active layer, and source and drain electrodes;
    forming first and second reflective electrodes over the thin film transistor, wherein the first and second reflective electrodes are separated from each other by a first gap, the first and second reflective electrodes are located at the first and second pixel regions, respectively, and completely cover the data line at the pixel regions;
    forming a photosensitive organic layer on an entire surface of the substrate having the first and second reflective electrodes;
    forming a patterned spacer filling the first gap between the first and second reflective electrodes by sequentially exposing and developing the photosensitive organic layer, wherein the photosensitive organic layer is exposed to light passing through the first gap;
    forming a color filter layer on a second substrate;
    forming a common electrode on the color filter layer;
    attaching the first and second substrates such that the first and second reflective electrodes face into the common electrode; and
    forming a liquid crystal layer between the first and second reflective electrodes and the common electrode.

10. The method according to claim 9, wherein the patterned spacer contacts the common electrode.

* * * * *